(12) United States Patent
Murray

(10) Patent No.: US 8,925,967 B2
(45) Date of Patent: Jan. 6, 2015

(54) SEAT BELT ARRANGEMENT

(75) Inventor: Ian Gordon Murray, Puttenham (GB)

(73) Assignee: Gordon Murray Design Limited, Shalford (GB)

( * ) Notice: Subject to any disclaimer, the term of this patent is extended or adjusted under 35 U.S.C. 154(b) by 0 days.

(21) Appl. No.: 13/811,351

(22) PCT Filed: Jul. 19, 2011

(86) PCT No.: PCT/GB2011/001083
§ 371 (c)(1),
(2), (4) Date: Jan. 21, 2013

(87) PCT Pub. No.: WO2012/010833
PCT Pub. Date: Jan. 26, 2012

(65) Prior Publication Data
US 2013/0127147 A1     May 23, 2013

(30) Foreign Application Priority Data
Jul. 23, 2010   (GB) .................................. 1012340.4

(51) Int. Cl.
*B60R 22/00* (2006.01)

(52) U.S. Cl.
USPC ...................................................... 280/801.1

(58) Field of Classification Search
USPC .................. 280/801.1, 801.2, 806, 807, 808; 297/468, 469, 474, 483
See application file for complete search history.

(56) References Cited

U.S. PATENT DOCUMENTS

| | | | |
|---|---|---|---|
| 4,198,091 A * | 4/1980 | Appleton | 296/63 |
| 5,123,673 A * | 6/1992 | Tame | 280/801.1 |
| 7,059,445 B2 * | 6/2006 | Higuchi et al. | 180/268 |

(Continued)

FOREIGN PATENT DOCUMENTS

| | | |
|---|---|---|
| DE | 10008562 A1 | 8/2001 |
| EP | 0374893 A2 | 6/1990 |

(Continued)

OTHER PUBLICATIONS

International Search Report and Written Opinion; PCT/GB2011/001083; Oct. 19, 2011.

*Primary Examiner* — Faye M. Fleming
(74) *Attorney, Agent, or Firm* — Westman, Champlin & Koehler, P.A.; Z. Peter Sawicki

(57) ABSTRACT

A seat belt arrangement for a vehicle seat having a seat part and a back part and which is positioned substantially centrally between the nearside and offside of a vehicle. First and second anchorage points are provided on the vehicle structure on opposite sides of the seat part, the first anchorage point providing an anchorage for one end of the seat belt and the second anchorage point comprising a latching mechanism for receiving a latch carried by the seat belt. A third anchorage point comprising a retractor system is located on the vehicle structure behind the seat. The first, second and third anchorage points are each located at a relatively low position; and an upper mounting provided on the back part (towards an upper end thereof) is at a higher level than the first, second and third anchorage points. In a secured position, a seat belt extends behind the back part of the seat from the retractor system to the upper mounting, through the upper mounting, in front of the front of the back part diagonally from the upper mounting to the latching mechanism of the second anchorage point and over the seat part from the latching mechanism to the first anchorage point.

11 Claims, 3 Drawing Sheets

(56) References Cited

U.S. PATENT DOCUMENTS

| | | | |
|---|---|---|---|
| 7,131,668 B2 * | 11/2006 | Go | 280/808 |
| 7,475,909 B2 * | 1/2009 | Takao et al. | 280/801.2 |
| 8,052,170 B2 * | 11/2011 | Pelliccia et al. | 280/808 |
| 2010/0194089 A1 * | 8/2010 | Ito et al. | 280/801.2 |

FOREIGN PATENT DOCUMENTS

| | | |
|---|---|---|
| EP | 0374973 A2 | 6/1990 |
| EP | 0590237 A1 | 4/1994 |
| GB | 2336136 A | 10/1990 |
| WO | 2008110814 A2 | 9/2008 |

\* cited by examiner

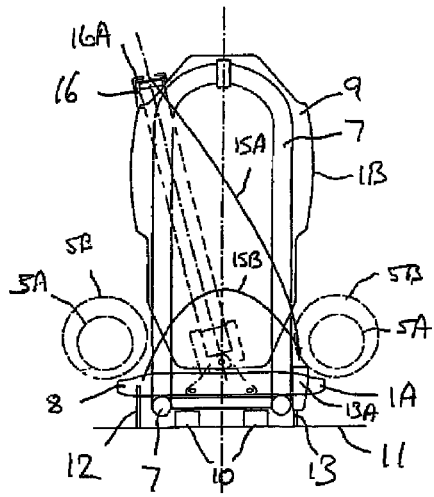

SEAT BELT ARRANGEMENT

CROSS-REFERENCE TO RELATED APPLICATION

This Application is a Section 371 National Stage Application of International Application No. PCT/EP2011/001083, filed Jul. 19, 2011 and published as WO/2012/01833 on Jan. 26, 2012, in English, which claims priority to GB Application No. 1012340.4, filed Jul. 23, 2010, the contents of which are hereby incorporated by reference in their entirety.

TECHNICAL FIELD

This invention relates to a seat belt arrangement for a vehicle seat which is positioned substantially centrally between the near side and off side of a vehicle.

BACKGROUND ART

WO2008/110814 describes a vehicle seating arrangement in which a driver's seat is positioned substantially centrally between the near side and off side of a vehicle. Two passenger seats are provided behind the driver's seat, but laterally offset therefrom, to provide a compact 3-seat arrangement.

With such an arrangement it is not appropriate to provide an upper seat belt mounting on a side of a vehicle (such as on the 'B' post) as in a conventional 2 or 4 seater car in which the driver's seat is positioned adjacent a side of the car (either the left hand side or right hand side). In a known 3-seat arrangement, the upper seat belt mounting is provided on the cabin roof. This requires the roof to comprise a structural member of sufficient strength to provide a secure mounting capable of withstanding forces applied to the seat belt in the event of a crash and requires the seat belt to extend up to the roof which interrupts the head space and can obstruct vision and movement within the vehicle cabin.

The present invention provides an alternative arrangement which seeks to avoid one or more of the limitations of the prior art.

SUMMARY OF INVENTION

According to a first aspect of the invention, there is provided a seat belt arrangement for a vehicle seat having a seat part and a back part and which is positioned substantially centrally between the nearside and offside of a vehicle, the arrangement comprising: first and second anchorage points on the vehicle structure on opposite sides of the seat part, the first anchorage point providing an anchorage for one end of the seat belt and the second anchorage point comprising a latching mechanism for receiving a latch carried by the seat belt; a third anchorage point comprising a retractor system located on the vehicle structure behind the seat, the first, second and third anchorage points each being located relatively low down on the vehicle structure; and an upper mounting provided on said back part at or towards an upper end thereof and thus at a higher level than the first, second and third anchorage points, whereby, in the secured position, a seat belt can extend behind the back part of the seat from the retractor system to the upper mounting, through the upper mounting, in front of the front of the back part diagonally from the upper mounting to the latching mechanism of the second anchorage point and over the seat part from the latching mechanism to the first anchorage point.

Such a seat belt arrangement enables the restraint forces to be borne by structural members low down on the vehicle structure, eg on the cabin floor (or members extending therefrom), and the seat structure and does not require the cabin roof to include a structural member and avoids the need for the seat belt to obstruct the space between the seat back and the cabin roof.

Preferred and optional features of the invention will be apparent from the subsidiary claims and from the following description.

BRIEF DESCRIPTION OF DRAWINGS

The invention will now be further described, merely by way of example, with reference to the accompanying drawings, in which:—

FIGS. 2, 3 and 4 are front, rear and side views of the driver's seat of such an arrangement showing a seat belt arrangement according to one embodiment of the invention.

DESCRIPTION OF PREFERRED EMBODIMENTS

Figure 1A:
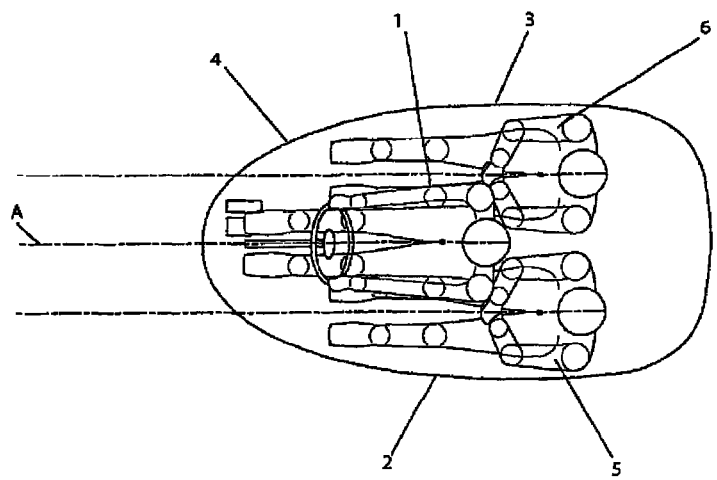
FIGS. 1A and 1B are schematic plan and side views of a 3-seat arrangement in a compact vehicle such as that described in WO2008/110814.
Figure 1B:
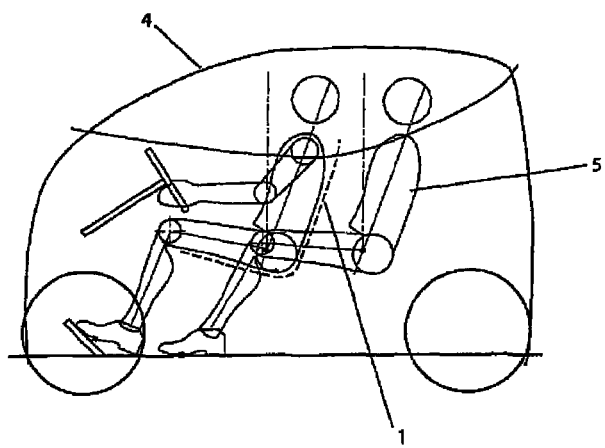
Figure 5:
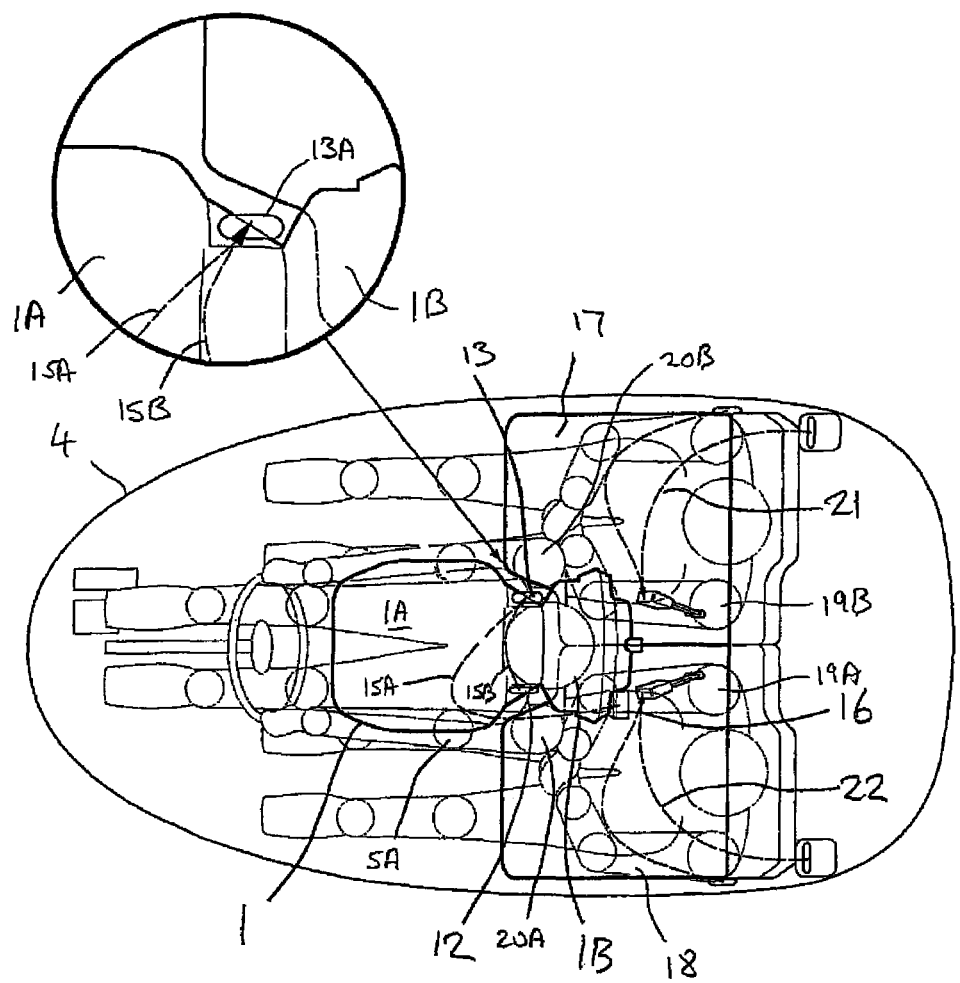
FIG. 5 is a plan view of a 3-seat arrangement with a driver's seat as shown in FIGS. 2 to 4 (but with the positions of the first and second anchorage points interchanged and the third anchorage point on the off side rather than the near side of the back part of the seat).

FIGS. 1A and 1B shows a 3-seat arrangement for a vehicle as described in WO2008/110814 in which the driver's seat 1 is positioned substantially centrally between the near side 2 and off side 3 of the vehicle cabin 4 with two passengers 5 and 6 behind the driver 1 but laterally offset relative to the driver's seat on either side of the central line A of the cabin 4. FIG. 5 shows such an arrangement using a seat belt arrangement as described below for the driver's seat.

FIGS. 2, 3 and 4 show front, rear and side views of the driver's seat 1, respectively. The seat 1 comprises a seat part 1A on which the driver sits and a back-part 1B which supports the driver's back. The seat 1 comprises a structural member 7 and seat and back cushions 8 and 9. In the embodiment illustrated, the structural member 7 comprises a substantially rigid tubular frame which extends from the seat part 1A to the back part 1B. The frame 7 comprises a tube which extends along one side of the seat part 1A, up one side of the back part 1B, across the top of the back part 1B, down the other side of the back part 1B and along the other side of the seat part 1A. It will be appreciated that with this arrangement, the back part 1B is fixed relative to the seat part 1A so cannot be folded relative thereto. The tubular frame 7 is slidably mounted to horizontal members 10 which may be structural components of the cabin floor 11 or secured to structural components of the cabin floor 11.

The tubular frame 7 may be formed from a steel (for example ERW3) tube with an outer diameter of 38.1 mm and a wall thickness of 2 mm, although other materials providing a structure of similar strength (and preferably similar weight) may be used. The tubular frame is preferably formed by shaping and bending the tube rather than cutting and joining so as to avoid stress concentrations or potential weak points inherent in joins such as welded joints.

In other arrangements (not shown), a pressed frame or a frame formed of composite materials may be used to provide a structure which is sufficiently rigid. It will be appreciated that as the frame has to bear forces applied thereto by the upper mounting 16 and transmit these to the vehicle structure without significant deformation of the seat, it is a critical component of the seat belt arrangement described herein.

The seat belt arrangement comprises three anchorage points 12, 13, 14, the first and second (12 and 13) are provided low down on either side of the seat part 1A. These are secured to a structural member of the cabin floor 11. The first anchorage point 12 provides a fixing for one end of the seat belt 15 and the second anchorage point 13 comprises a latching mechanism 13A. This mechanism 13A (see FIG. 4) can be of conventional design and is typically secured by a rigid or flexible member 13B to the second anchorage point 13. This member 13B may also be of conventional design.

The first anchorage point 12 comprises a permanent mounting for a first end of the seat belt 15. This may also be of conventional design and is also secured to a structural member on the floor 11 of the cabin.

The third anchorage point 14 comprises a retractor system 14A which is mounted behind the driver's seat 1, preferably in a substantially central position relative to the sides of the seat 1 (the retractor system typically comprises an inertia reel which locks if the seat belt is unwound therefrom above a pre-set speed). The retractor system 14A is preferably mounted low down towards the base of the seat back 1B and preferably near the floor 11 of the cabin (which may step up behind the driver's seat as shown in FIG. 4). The retractor system 14A is thus also secured to a structural member on the floor 11 of the cabin.

In the illustrated embodiment, the retractor system 14A is mounted to an upper corner of a triangular bracket 14B the lower edge of which is secured to a structural part of the cabin floor 11 (as shown in FIG. 4).

The seat belt arrangement also comprises an upper mounting 16 which is provided on one side of the seat back 1B at or towards an upper end thereof and so at a higher level than the first, second and third anchorage points 12, 13, 14 described above. Preferably, the upper mounting 16 is secured to the structural member 7 of the seat back 1B and is located at or towards the upper end of the seat back 1B so as to be at a height similar to or above the shoulder of a person sitting in the driver's seat 1 (see FIG. 4). The upper mounting 16 comprises a bracket 16A secured to the tubular frame 7 having a slot or channel through which the seat belt 15 passes.

Thus, in use, a seat belt 15 extends behind the back part 1B from the retractor system 14A behind the seat up to the upper mounting 16, through the upper mounting 16 and then in front of the seat back 1B and the driver diagonally across the driver's torso from the upper mounting 16 to the latching mechanism 13A of the second anchorage point 13 and then over the seat part 1A across the driver's lap from the latching mechanism 13A to the first anchorage point 12. FIGS. 2 and 3 illustrate the seat belt run with the portions of the seat belt in front of the seat back being indicated schematically by arrows 15A and 15B.

The seat belt 15 thus provides a 3-point fixing as a conventional seat belt although, in this case, the upper fixing is, in effect, provided by the upper mounting 16 on the seat back 1B combined with the retractor mechanism 14A secured to the third anchorage point 14 positioned low down on the vehicle structure. All three anchorage points 12, 13, 14 are provided low down so they can be provided by structural components of the cabin floor 11 (or extending from the cabin floor). Accordingly, there is no need to provide an upper mounting on a B-post on one side of the cabin 3 or to a structural member provided in the roof of the cabin (as in the prior art).

As the upper mounting 16 is provided on the seat 1, it provides a consistent belt run across the upper torso of the driver, irrespective of the position of the seat 1 in the forward and backward positions along the centre line A. This is in contrast to prior art in which an upper mounting is fixed to the vehicle body so the belt run changes depending on the position of the seat (or of the seat back)—unless an additional mechanism is provided to enable the fore and aft position of the upper mounting to be adjusted.

Also, as the first, second and third anchorage points 12, 13, 14 are all mounted low down, they do not inhibit entry or egress of the driver (or of the passengers). Preferably, the first and second anchorage points 12, 13 are mounted beneath the upper surface of the seat cushion 8 of the seat part 1A.

The location of the upper mounting 16 can be provided on either the left side or right side of the seat back 1B. FIG. 5 shows an arrangement with the upper mounting 16 on the left side of the seat back 1B.

In a further arrangement (not shown), an upper mounting 16 may be provided on both the left and right side of the seat back 1B so the same seat can be used to provide left or right hand configurations, eg depending on the country in which the vehicle is to be sold. As the seat belt 15 does not extend above the upper mounting 16, it also does not pass through the space above the seat back 1B so does not impede entry or egress of the passengers 5, 6, and does not obstruct the head space or impede the vision within the cabin 4. This provides a significant advantage over prior art which requires the belt run to pass through this upper space to the cabin roof. It also enables other forms of roof structures to be provided (which would not be compatible with supporting an upper seat belt anchorage point).

As described in WO2008/110814, cut-outs or recesses are provided in the sides of the seat part 1A (at the rear end where the seat part 1A meets the back part 1B) and/or in the sides of the back part 1B (at the lower end where the back part 1B meets the seat part 1A) for accommodating part of the legs, e.g. the knees, of passengers sitting in the passenger seat. As explained in WO2008/110814, this enables a very compact seating arrangement to be provided. FIG. 5 shows the seat part 1A having cut-outs at its rear corners. The seat belt arrangement described herein is particularly suited for use on the driver's seat in such a compact arrangement. FIGS. 3 and 5 show schematically the positions of a passenger's knee 5A and upper leg 5B relative to the driver's seat. As these Figures illustrate, the passenger's knee and upper leg 5A, 5B are accommodated in recesses in the rear part of the seat 1A and/or lower part of the seat back 1B. By this means, the passengers can be positioned closer to each other than would otherwise be possible. As shown in FIGS. 1A and 5, the passenger's inboard shoulders 19A, 19B, lie inboard of the driver's shoulders 20A, 20B. The spacing between the passengers' shoulders 19A, 19B is thus less than the spacing between the driver's shoulders 20A, 20B.

The first and second anchorage points 12 and 13 are also preferably positioned so that the seat belt 15 and/or the latching mechanism 13A are located within these cut-outs, at least in rearward positions of the driver's seat. As shown in FIG. 5 the rear corners of the seat part 1A are angled so as to provide these cut-outs (this is also shown more clearly in the enlarged portion of FIG. 5). This also helps ensure that the seat belt and the anchorage points are out of the way of the legs or feet of a passenger seated in either of the passenger seats. In addition, as shown in FIG. 5, the front, inboard corners of the passenger seats 17, 18 can be shaped so that the passenger seats 17, 18 overlap with the position of the driver's seat 1 both laterally and longitudinally (at least in the most rearward position of the driver's seat). This enables the driver's seat 1 to be slid backwards further than would otherwise be possible.

The seat belts 21, 22 for the passenger seats 17, 18 may be of conventional design as shown in FIG. 5.

It will of course be understood that many variations may be made to the above-described embodiment without departing from the scope of the present invention.

The invention claimed is:

1. A seat belt arrangement for a vehicle seat having a seat part and a back part and which is positioned substantially centrally between the nearside and offside of a vehicle, the arrangement comprising:
    first and second anchorage points on the vehicle structure on opposite sides of the seat part, the first anchorage point providing an anchorage for one end of the seat belt and the second anchorage point comprising a latching mechanism for receiving a latch carried by the seat belt;
    a third anchorage point comprising a retractor system located on the vehicle structure behind the seat, the first, second and third anchorage points each being located at a relatively low position;
    a relatively lightweight structural member which extends from the seat part of the back part thereof; and
    an upper mounting comprising a bracket fixedly secured to the back part of the seat back having a slot or channel through which the seat belt passes and provided on said back part at or towards an upper end thereof and thus at a higher level than the first, second and third anchorage points, whereby, in the secured position, a seat belt can extend behind the back part of the seat from the retractor system to the upper mounting, through the upper mounting, in front of the front of the back part diagonally from the upper mounting to the latching mechanism of the second anchorage point and over the seat part from the latching mechanism to the first anchorage point.

2. The seat belt arrangement as claimed in claim 1 in which the structural member comprises a substantially rigid tubular frame extending from the seat part to the back part.

3. The seat belt arrangement as claimed in claim 1 in which the third anchorage point is located substantially centrally behind the seat.

4. The seat belt arrangement as claimed in claim 1 in which the position of the seat is adjustable forwards and backwards.

5. The seat belt arrangement as claimed in claim 1 having cut-outs or recesses at the rear corners of the seat part, the first and second anchorage points being positioned so that, at least in some positions of the vehicle seat, the seat belt and/or the latching mechanism is/are located in said cut-outs or recesses when in the secured position.

6. The seat belt arrangement as claimed in claim 1, in which the upper mounting can be selectively provided on the left or right hand side of the back part of the seat or on both sides thereof.

7. The seat belt arrangement as claimed in claim 1 in which the seat is the driver's seat.

8. The seat belt arrangement as claimed in claim 7 in which passengers' seats are provided behind the driver's seat but laterally offset therefrom.

9. The seat belt arrangement as claimed in claim 8 in which the drivers seat and the passenger seat are positioned and shaped such that, in use, the passenger legs overlap the divers seat in the fore and aft direction and/or the lateral direction.

10. The seat belt arrangement as claimed in claim 9 in which cut-outs or recesses are provided in the sides of the seat part and/or the back part of the driver's seat for accommodating parts of the legs of passengers seated in the passenger seats.

11. The seat belt arrangement as claimed in claim 10 in which inboard front corners of the passenger seats are shaped to permit lateral and longitudinal overlap with the seat part of the driver's seat, at least in the most rearward position of the driver's seat.

* * * * *

UNITED STATES PATENT AND TRADEMARK OFFICE
CERTIFICATE OF CORRECTION

PATENT NO. : 8,925,967 B2  
APPLICATION NO. : 13/811351  
DATED : January 6, 2015  
INVENTOR(S) : Ian Gordon Murray Page 1 of 1

It is certified that error appears in the above-identified patent and that said Letters Patent is hereby corrected as shown below:

IN THE CLAIMS

Claim 9, Column 6, Line 24, delete "divers" and insert --driver's--

Signed and Sealed this
Sixth Day of October, 2015

Michelle K. Lee
*Director of the United States Patent and Trademark Office*